(No Model.) 2 Sheets—Sheet 1.
C. MORRILL.
VENT BUNG.
No. 373,565. Patented Nov. 22, 1887.
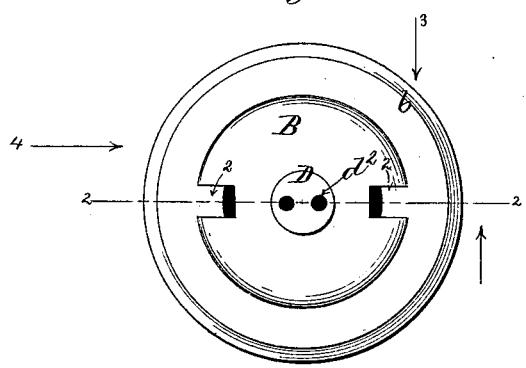
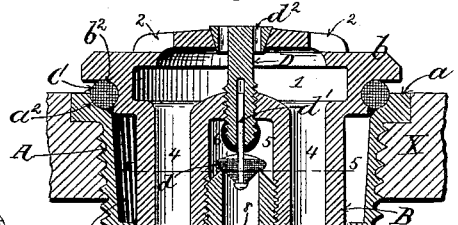
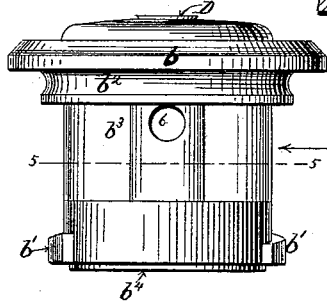
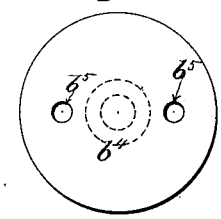
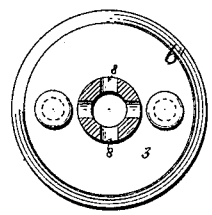
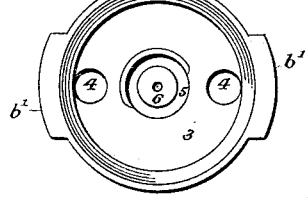
Witnesses:
Geo. W. Miatt
E. B. Bolton
Inventor:
Charles Morrill
By Henry Connett
his atty.

(No Model.) 2 Sheets—Sheet 2.
C. MORRILL.
VENT BUNG.
No. 373,565. Patented Nov. 22, 1887.
Fig. 9.
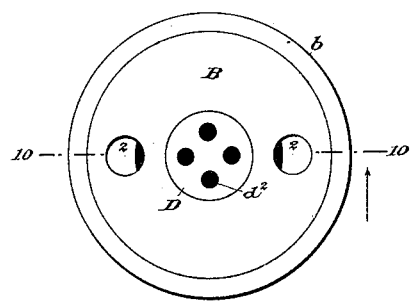
Fig. 10.
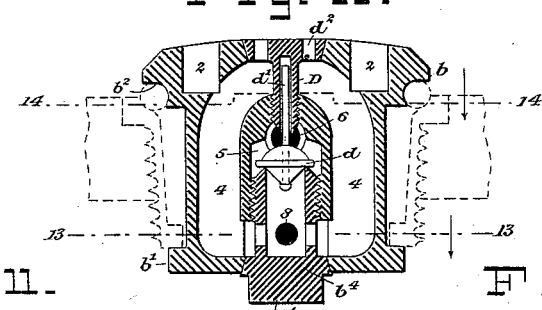
Fig. 11.
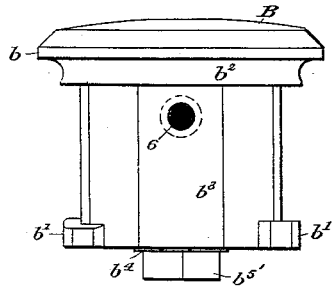
Fig. 12.
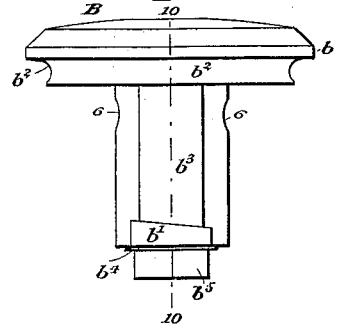
Fig. 14
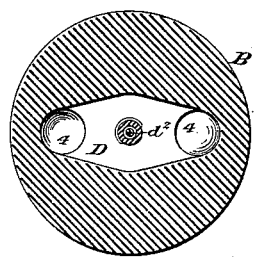
Fig. 13.
WITNESSES:
E. B. Bolton
J. H. Caplinger
INVENTOR:
Charles Morrill
By Henry Connett
Attorney.

UNITED STATES PATENT OFFICE.

CHARLES MORRILL, OF JERSEY CITY, NEW JERSEY.

VENT-BUNG.

SPECIFICATION forming part of Letters Patent No. 373,565, dated November 22, 1887.

Application filed April 14, 1887. Serial No. 234,753. (No model.)

*To all whom it may concern:*

Be it known that I, CHARLES MORRILL, a citizen of the United States, and a resident of Jersey City, Hudson county, New Jersey, have invented certain new and useful Improvements in Vent-Bungs for Casks, of which the following is a specification.

My invention relates to a bung (comprising the stopper and bush) and a vent for casks, particularly those for containing beer; and my object is to produce a practicable bung and vent that may be manufactured at a reasonable cost, that shall be strong and durable, that may be readily cleaned, and that shall not be liable to derangement.

Many forms of vent-bungs for beer-casks have heretofore been proposed; but, so far as I am aware, these have all had some defect sufficient to prevent them from being adopted to any material extent by brewers. Some have been too costly, others too complex and liable to derangement for this reason, and others have been too frail to withstand the rough usage to which brewers subject them.

The characteristics of my vent-bung are its simplicity of construction and durability and the ample provision for the passage of air through the bung to the cask, whereby clogging up or choking is avoided, and whereby ample provision is made for thoroughly washing the interior cavities of the bung and vent.

My invention will be fully described, and its novel features carefully defined in the claims.

In the drawings which serve to illustrate my invention two forms of the bung are shown, both having like characteristics.

Figure 1 is a plan of one form of my vent-bung. Fig. 2 is a vertical axial section of the same in the plane indicated by lines 2 2 in Figs. 1, 4, and 5. Fig. 3 is a side elevation of the same as seen from the direction indicated by arrow 3 in Figs. 1 and 4. Fig. 4 is a side elevation of the same as seen from the direction indicated by arrows 4 in Figs. 1 and 3. Fig. 5 is a transverse section in the plane indicated by lines 5 5 in Figs. 2, 3, and 4. Fig. 6 is a view of the bottom of the stopper or bung proper as it appears when the closing screw-cap is removed. Fig. 7 is a transverse section of the tubular part of the screw-cap, taken in the plane indicated by line 7 7 in Fig. 2. Fig. 8 is a bottom view of the closing screw-cap. Figs. 9 to 14 illustrate the other form of my vent-bung. Fig. 9 is a plan corresponding to Fig. 1 of this form of the bung. Fig. 10 is an axial section, the plane of the section being indicated by lines 10 10 in Figs. 9 and 12. Figs. 11 and 12 are elevations of this form of the bung corresponding, respectively, to Figs. 3 and 4. Figs. 13 and 14 are respectively transverse sections taken in the planes indicated, respectively, by lines 13 13 and 14 14 in Fig. 10.

I will first describe that form of the vent-bung illustrated in Figs. 1 to 8.

X in Fig. 2 represents part of the stave of a cask, in which is screwed the bush A. This bush has the usual tubular construction, and is provided with a flange, $a$, which rests on the stave, and is herein shown as recessed in the same. The bush is also provided with locking-lips $a'$ $a'$ on its inner end, which may be of the usual character.

B represents the stopper or bung proper, which is provided with a flange, $b$, that projects out over the bush-flange when the bung is placed as in Fig. 2. The bung is also provided with locking-lips $b'$ $b'$ on its inner end, which are adapted to engage the lips $a'$ on the bush in the usual way with bungs of this class.

The hermetic sealing or packing of the joint between the flanges on the bung and bush I prefer to effect by the following-described means, namely: In the body of the bung B, just under the flange $b$, I form an annular groove, $b^2$, to fit and receive a packing-ring, C, of rubber or similar elastic yielding material, which I make substantially circular in cross-section and of such size that it will embrace the bung tightly and be thus retained in place. I also form an annular recess, $a^2$, in the bush-flange at its inner margin to receive this ring C. This latter recess is somewhat in the form of a chamfer or bevel, as clearly illustrated in Fig. 2, and the surface of this chamfer I make smooth, so as not to cut the rubber ring when the bung is placed and rotated in effecting the locking.

The peculiar form of the bung B is well illustrated in Figs. 2, 3, 4, and 5. The bung is substantially hollow, the cavities for the passage of air and of water in washing being very large. In the head of the bung is a cavity, 1, into which open one or more apertures, 2, in the crown of the bung to admit air. The recesses formed in the crown of the bung at these apertures serve as sockets to receive the wrench for screwing in the bung. In the inner end of the bung is a chamber, 3, and said chambers 1 and 3 are connected by a wide passage or passages, 4, formed in the neck or middle section, $b^3$, of the bung. In this neck $b^3$ is also formed a valve-chamber, 5, from which a passage, 6, one or more, opens out through the side of the neck $b^3$ into the space between the bung and bush, which space is open to the interior of the cask. I have shown but one of these openings or passages 6; but there may be two, oppositely arranged.

The valve-chamber 5 is provided at its open inner end with a female screw to receive a male screw on the tubular or hollow stem of the screw-cap $b^4$, which serves to close the inner end of bung B. The enlarged disk-like head of the screw-cap is coned at its margin to fit a coned seat formed on the inner end of the bung, as clearly shown in Fig. 2, and the end of its tubular stem, which projects up into the valve-chamber 5, is constructed to form a seat for the vent-valve $d$. This valve I usually make of rubber, of the conical form represented, and its stem $d'$ plays in a guide-bore formed in a screw, D, which passes down through an aperture in the crown of bung B and screws through the crown or roof of the valve-chamber 5. The head of screw D is coned and fits into a coned seat formed in the crown of the bung when the screw is driven home. Holes $d^2$ in the head of screw D serve to form sockets to receive the prongs of a fork-wrench for driving said screw home, and also as additional air-inlets. However, recesses merely to receive the wrench-prongs will serve, as the admission of air is otherwise provided for. The tubular stem of the closing-cap $b^4$ is provided with one or more apertures, 8 8, in its walls, which open into the chamber 3 of the bung, and thus serve, in conjunction with the other apertures and passages in the bung, to admit air to the under side of valve $d$. Sockets $b^5$ in the closing-cap $b^4$ are designed to receive the prongs of a fork-wrench in screwing said cap up to its seat.

I have omitted the packing-ring C from Figs. 3 and 4 in order to better illustrate the form of groove $b^2$ that receives it.

If it be necessary, my vent-bung may be quickly and conveniently taken apart for thoroughly cleansing it. To do this the closing-cap $b^4$ is unscrewed and taken out, when the valve $d$ will drop out of itself. The screw D may also be taken out. In replacing cap $b^4$ it is only necessary to screw it in tight. As the apertures 8 in its stem open into the chamber 3, it is not necessary to insure their coincidence with other apertures or passages, as in other vent-bungs of this general character. In its operation as a vent the air may enter at apertures 2 and $d^2$ into chamber 1, pass thence to the chamber 3 through passages 4, pass thence through apertures 8 to the under side of the valve, and, raising it, pass to the interior of the cask by way of the aperture or passage 6. The gas from the cask, entering the valve-chamber 5 at the aperture 6, is prevented by the valve from escaping to the outer air.

In washing or cleansing my vent-bung it will not be necessary, ordinarily, to take it apart. The apertures and interior passages are so large and accessible that the water will pass through it readily without this. Should dirt get into the bung at the air-inlets, the chamber 3 is so capacious that a considerable amount of it or of sediment may collect therein without choking up the air-passages. By placing the guide-stem $d'$ of the valve on its upper side I avoid clogging or choking up the passage under the valve—an event very likely to occur in the case of such vents where the valve-stem is ribbed and guided in the air-passage below the valve.

The bung, as will be seen by inspection of the drawings, has a cylindrical head or outer end which fits into the bush, and in which is formed chamber 1, an inner cylindrical head or part, which also fits into the bush, and which contains the chamber 3 and carries the lips $b'$, and the reduced connecting-neck $b^3$, in which are formed the valve-chamber and the air-passages 4 4. This construction produces a very light and strong bung.

My bung has these important advantages: The packing-ring cannot become readily detached from the bung, and will last for a long time, owing to its form and the arrangement of the seat on the bush. The bung is light, very strong and durable, and easily and cheaply constructed. It may be handled, used, cleansed, and even taken to pieces, by any one without risk of injury to it, and it is thoroughly reliable and effective, both as to its functions as a hermetic stopper for the cask and as to its functions as a vent.

Having thus described my invention, I do not wish to be understood as limiting myself to the precise construction herein shown, as this may be varied somewhat without departing entirely from my invention. For example, in the form of vent-bung illustrated in Figs. 9 to 14 will be found a slight departure in construction from that described, although the principles of construction and operation are the same in both. I will only need to point out with reference to Figs. 9 to 14 wherein this construction differs from the other. In this form I partially eliminate the chambers 1 and 3, bringing the passages 4 4 together at the top and bottom, as shown. The screw-cap $b^4$ is of less diameter than that before described and has a squared head, $b^5$, to receive a wrench. In this form of the vent-bung the inner end of the bung is not circular, but has the form or contour best seen in Fig. 13. Otherwise the construction is the same as that first described.

I wish it understood that I do not claim, broadly, the arrangement of the locking-lips for securing the bung in the bush, nor a lift-valve for controlling an air-passage through the bung into the cask. These devices have before been employed in bungs; but What I do claim is—

1. The combination, with the bung B, having a chamber, 1, in its upper end, an air-inlet, 2, opening into said chamber, a chamber, 3, in its lower part, an air-passage, 4, connecting chambers 1 and 3, a valve-chamber, 5, and an aperture, 6, opening out from said chamber, of the closing-cap $b^4$, provided with a tubular part that screws into said valve-chamber, said tubular part having air-apertures 8, opening into chamber 3, the valve $d$ and its stem, and the screw D, screwed into the crown of the valve-chamber and provided with a bore to receive and guide the valve-stem.

2. The combination, with the bung provided with a valve-chamber and valve-seat, of the lift-valve arranged in said chamber on said seat, the valve-stem on the upper face of said valve, and the screw D, provided with a bore to receive the valve-stem and form a guide therefor and driven down through the crown or roof of the valve-chamber, substantially as set forth.

3. The combination, with the bung proper, provided with a conical aperture in its crown, and a valve-chamber in its interior, of the lift-valve in said chamber, the screw D, provided with an apertured conical head and a bore to form a guide for the valve-stem, said screw being driven down through the crown or roof of the valve-chamber and its head seated in the coned aperture in the bung, and a cap, $b^4$, provided with a tubular stem that screws into the bottom of the valve-chamber, its upper end forming the seat for said lift-valve, as set forth.

In witness whereof I have hereunto signed my name in the presence of two subscribing witnesses.

CHAS. MORRILL.

Witnesses:
HENRY CONNETT,
T. D. CAPLINGER.